United States Patent
Li et al.

(10) Patent No.: US 9,121,114 B2
(45) Date of Patent: Sep. 1, 2015

(54) HYBRID CORDS HAVING HIGH TENACITY AND HIGH ELONGATION AT BREAK

(75) Inventors: Xuedong Li, Shanghai (CN); Johnason Shi, Shanghai (CN)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 144 days.

(21) Appl. No.: 13/989,446

(22) PCT Filed: Dec. 16, 2011

(86) PCT No.: PCT/US2011/065445
§ 371 (c)(1),
(2), (4) Date: May 24, 2013

(87) PCT Pub. No.: WO2012/083148
PCT Pub. Date: Jun. 21, 2012

(65) Prior Publication Data
US 2013/0239539 A1    Sep. 19, 2013

(30) Foreign Application Priority Data
Dec. 16, 2010   (CN) .......................... 2010 1 0613119

(51) Int. Cl.
*D02G 3/36*    (2006.01)
*B60C 9/00*    (2006.01)
*D02G 3/48*    (2006.01)

(52) U.S. Cl.
CPC ................ *D02G 3/36* (2013.01); *B60C 9/005* (2013.04); *B60C 9/0042* (2013.04); *D02G 3/48* (2013.01); *D10B 2331/021* (2013.01)

(58) Field of Classification Search
CPC .................................... D02G 3/36; D02G 3/48
USPC ........................................... 57/210, 236, 238
See application file for complete search history.

(56) References Cited

U.S. PATENT DOCUMENTS

| | | | |
|---|---|---|---|
| 4,333,507 A | 6/1982 | Schmit et al. | |
| 5,271,445 A | 12/1993 | Kohno et al. | |
| 5,327,714 A * | 7/1994 | Stevens et al. | 57/230 |
| 6,799,618 B2 | 10/2004 | Reuter et al. | |
| 7,155,891 B2 * | 1/2007 | Bader | 57/210 |
| 2005/0055997 A1 | 3/2005 | Bader | |

(Continued)

FOREIGN PATENT DOCUMENTS

| | | |
|---|---|---|
| DE | 4135599 | 5/1993 |
| EP | 0567334 | 10/1993 |
| EP | 2184388 | 10/2008 |

OTHER PUBLICATIONS

PCT International Search Report and Written opinion for International Application No. PCT/US2011/065445 Dated Apr. 12, 2012.

*Primary Examiner* — Shaun R Hurley

(57) ABSTRACT

A hybrid cord, comprising (a) a core yarn consisting of meta-aromatic polyamide fibers, and (b) at least one wrapping yarn consisting of para-aromatic polyamide fibers that warps around the core yarn at a helical angle, wherein (i) the core yarn makes up 20-60% by weight and the wrapping yarn makes up 40-80% by weight of the hybrid cord, based on the total weight of the hybrid cord, (ii) the twist multiplier of the core yarn is 0-0.5, the twist multiplier of the hybrid cord is 4.5-12; and the twist per meter (tpm) ratio between the at least one wrapping yarn and the hybrid cord ranges from 0.8 to 1.2, and (iii) the helical angle of the wrapping yarn is 10-60 degrees.

6 Claims, 2 Drawing Sheets

(56) References Cited

U.S. PATENT DOCUMENTS

2008/0072984 A1 3/2008 Branch et al.
2009/0090447 A1 4/2009 Baldwin, Jr. et al.
2010/0205723 A1* 8/2010 Takahashi et al. ............... 2/458

* cited by examiner

HYBRID CORDS HAVING HIGH TENACITY AND HIGH ELONGATION AT BREAK

BACKGROUND OF THE INVENTION

1. Field of the Invention

The present invention relates to a hybrid cord with a high tenacity and high elongation at break which can be used in rubber products and other expandable elastic products, particularly to pneumatic tires.

2. Description of the Related Art

Currently, fiber-reinforced rubber products have been applied extensively, such as for pneumatic tires, hoses, belts, and bellows. Fibers embedded in the rubber matrix serve as a reinforcing component to support the structure of the rubber product. Many rubber products have the requirement of a high strength and high pressure, while requiring a sufficiently large deformation or expandability to offset the stress. For example, in some aircraft tires, a protective (breaker) layer with high strength and expandable is required on top of the belt layer. When the tire is in the initial stage of expansion under a pressure or load, the tire and the belt layers will undergo expansion to bear the stress, while the protective layer, too, will expand but will not share much of the load. When the expansion becomes large enough, the protective layer begins to share a significant amount of the load so that the tire is protected at high stress. Another example can be found in some elastomeric bellows. These elastomeric bellows require to have a high pressure rating at burst, and can expand adequately before explosion.

Steel wire and para-aromatic polyamide fibers have high strength, but their elongation at break is low. The steel wire's elongation at break is normally 2%-6%, and the elongation at break of pars-aromatic polyamide fibers is normally 2%-5%. They are both suitable for applications requiring high strength and low elongation at break, but not suitable for applications requiring high elongation at break as mentioned above. Nylon and polyester fibers have a very high elongation at break, both of which reach 15%-25%. However, in some applications that require the bearing of a high burst pressure or high load, neither of them has sufficient strength.

In order to solve the problem mentioned above and to meet the industrial demand, researchers have developed various technologies. Disclosed in U.S. Pat. No. 5,271,445 is a wavy or zig-zag-shaped cord technology. During the initial load stage, the wavy cord is extended to a straightened form, and then during the later load stage, the straightened cord bears the load. An example of the cord material is an aromatic polyamide. A similar technology for the use of steel wire cord is disclosed in European Patent 0567334B1.

Twisting fibers of high tenacity to a high twist level, that is, a high number of sts per unit length, can increase the elongation at break of the fibers and improve the fatigue resistance of the fibers. However, the strength of said fibers also decreases with the higher twist level. For example, Kevlar® 29 fibers of 1500 denier normally have the tenacity of 23 grams/denier and the elongation at break of 3.6%. When it is twisted to 480 tpm (twists per meter), its elongation at break is increased to 5.2%, but its tenacity decreases to 10 grams/denier. When it is twisted to an even higher twist level of 610 tpm, its elongation at break is increased to around 8.5%, but its tenacity further decreases to around 8 grams/denier.

Hybrid twisting of fibers having high tenacity with fibers having high fatigue resistance and high elongation at break, too, is a possible solution. The hybrid cord has already been used in pneumatic tires as a reinforcement material to improve the fatigue resistance and other properties. Disclosed in the US patent publication 2009/0090447A1 is a cord of the aromatic polyamide/nylon hybrid construction (1 ply of aromatic polyamide of 1500 denier and 1 ply of nylon of 1260 denier twisted together). Said hybrid cord has a break load of 332 Newton, which is equivalent to a tenacity of 12.3 grams/denier, and an elongation at break of 16.4%. This hybrid cord can be used in aircraft tires. Disclosed in U.S. Pat. No. 6,799,618B2 are some aromatic polyamide/nylon hybrid cord structures, whose maximum tenacity can be up to 13.3 grams/denier, while their maximum elongation at break can be up to 17%. There have not been any hybrid cords of even higher elongation at break disclosed in the two references mentioned above.

Disclosed in U.S. Pat. No. 4,333,507 is a composite cord for reinforcing tires. The core yarn of said composite cord is polyolefin fibers, such as polyethylene or polypropylene fibers, while its wrapping yarn includes nylon, aromatic polyamide, steel wire, etc. When a composite cord of this kind is embedded in the rubber matrix, because its core yarn can be melted or degraded at the vulcanization temperature of rubber (around 150° C.), the rubber product prepared has a very high elongation at break, but its tenacity is still insufficient. Besides, composite cords made of fibers with high melting points such as a polyamide, polyester, and/or aromatic polyamide, cannot be melted or degraded at the vulcanization temperature of rubber, to provide the enhanced elongation at break.

Therefore, there is still a need to have a hybrid cord of high tenacity and high elongation at break, to apply to rubber products and to other expandable elastic products.

SUMMARY OF THE INVENTION

The present invention provides a hybrid cord having a tenacity greater than 9 grams/denier and an elongation at break greater than 20%. The hybrid cord can be applied ideally to the reinforcement of rubber and other elastic matrix products.

One aspect of the present invention provides a hybrid cord comprising:

(a) a core yarn, which is formed by meta-aromatic polyamide fibers; and (b) at least one wrapping yarn, which is formed by para-aromatic polyamide fibers and wraps around the core yarn at a helical angle.

Another aspect of the present invention relates to articles comprising the hybrid cord of the present invention.

Yet another aspect of the present invention relates to the use of the hybrid cord of the present invention in the reinforcement of rubber or other elastic matrix products.

DETAILED DESCRIPTION OF THE INVENTION

Figure 1:
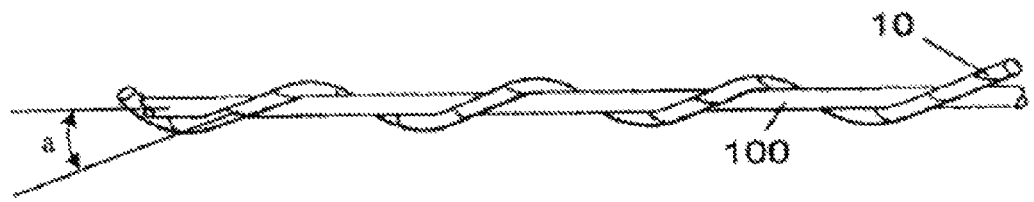
FIG. 1 is a schematic diagram of a hybrid cord constructed according to one embodiment of the present invention.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

In the present article, the term "formed by . . . " or "constituted by . . . " is synonymous to "comprising". As used herein, the term "produced from" or "is synonymous to "comprising". As used herein, the terms "comprises," "comprising," "includes," "including," "has," "having," "contains" or "containing," or any other variation thereof, are it tended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

Further, unless expressly stated to the contrary, "or" refers to an inclusive "or" and not to an exclusive "or". For example, a condition A "or" B is satisfied by any one of the following: A is true (or present) and B is false (or not present), A is false (or not present) and B is true (or present), and both A and 13 are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The materials, methods, and examples herein are illustrative only and, except as specifically stated, are not intended to be limiting. Although methods and materials similar or equivalent to those described herein can be used in the practice or testing of the present invention, suitable methods and materials are described herein.

In the present application, the term "aromatic polyamide fibers" refers to fibers made of a linear polymer constituted by an amide bond or imide bond connected with an aromatic group through spinning, wherein at least 85% amide bond or imide bond is directly connected with two aromatic rings; also, when an imide bond is present, its number must be no more than that of the amide bond.

Typical aromatic polyamide fibers are, for example, but not limited to, Kevlar® series and Nomex® series manufactured by E.I. duPont de Nemours and Company, Wilmington Del. (DuPont).

The term "yarn" refers to yarn constituted by one ply or multiple plies of fibers, and when it is constituted by multiple plies of fibers, the yarn can be formed by combining multiple untwisted plies of fibers together. It can also be formed by twisting multiple plies of fibers together, and can also be formed by combining multiple plies of fibers together, wherein each ply of the fibers was previously twisted alone.

The term "core yarn" refers to a piece of yarn located in the core of the hybrid cord.

The term "wrapping yarn" refers to a ply or multiple plies of yarn wrapping around the core yarn.

The term "helical angle" refers to the angle between the tangential direction of the wrapping direction of the wrapping yarn and the length direction of the hybrid cord.

The term "d" or "denier" refers to the grams of the weight of 9000 meters of untwisted yarn or fibers. Generally, the greater the denier, the thicker the yarn or fibers will be. For a yarn consisting of multiple plies of fibers, its denier is the total denier of the multiple plies of fibers contained. For example, a twisted yarn made of 3 plies of fibers of 1500 denier is considered to be a yarn of 4500 denier. However, actually, through twisting, the weight of said yarn within the unit length will be slightly higher than 4500 denier.

In the hybrid cord of the present invention, the core yarn is formed by at least one ply of meta-aromatic polyamide fibers, and there is no specific restriction to the properties of the meta-aromatic polyamide fibers. The linear density of one ply of meta-aromatic polyamide fibers is preferably ranging from 200 to 3500 denier, more preferably from 1000 to 2000 denier; the tenacity is preferably ranging from 3 to 7 grams/denier, and the elongation at break is preferably ranging from 20 to 40%.

In the hybrid cord of the present invention, each wrapping yarn is formed by at least one ply of para-aromatic polyamide fibers, and there is no specific limitation to the properties of the para-aromatic polyamide fibers. The linear density of the ply of p-aromatic polyamide fibers is preferably ranging from 200 to 3500 denier, more preferably from 600 to 2000 denier, the tenacity is preferably ranging from 18 to 28 grams/denier, and the elongation at break is preferably ranging from 1.5-5.0%.

Some factors that may affect the properties of the hybrid cord of the present invention include, but are not limited to, the weight percentage of the para-aromatic polyamide fibers and the meta-aromatic polyamide fibers, the number of the first twist of the core yarn and the wrapping yarn, and the number of the second twist after combining both yarns, as well as the twisting direction and method.

In the hybrid cord, the weight percentage of the para-aromatic polyamide fibers and the meta-aromatic polyamide fibers can be varied in accordance with the application of the hybrid cord, so that the tenacity and/or elongation at break of the hybrid cord can meet the requirements of the application. Preferably, in the hybrid cord of the present invention, on the basis of the total weight of the hybrid cord, the core yarn makes up 20-60% by weight, while the wrapping yarn makes up 40-80% by weight.

The term "first twist" refers to the process of twisting of at least one ply of fibers that constitutes the core yarn or the wrapping yarn; while the term "second twist" refers to the process of twisting to form the hybrid cord after combining the core yarn and the winding yarn.

The core yarn is constituted by at least one ply of meta-aromatic polyamide fibers, and the at least one ply of meta-aromatic polyamide fibers can be one without twisting (that is, untwisted); it may also be one that is slightly twisted. The number of the first twist is preferably ranging from 0 to 20 twists/meter, more preferably from 0 to 10 twists/meter. When the core yarn is constituted by two or more plies of meta-aromatic polyamide fibers, the two or more plies of fibers can be untwisted, twisted together, or twisted individually before being combined.

Each ply of the wrapping yarn is constituted by at least one ply of para-aromatic polyamide fibers. When the wrapping yarn is constituted by two or more plies of para-aromatic polyamide fibers, the two or more plies of fibers can be twisted together or twisted individually before being combined. The number of the twist of the first twist of the wrapping yarn is preferably ranging from 100 to 1000 twists/meter, more preferably from 100 to 500 twists/meter; the ratio between the number of the first twist of the wrapping yarn and the number of the second twist of the hybrid cord is preferably 0.8-1.2.

Figure 2:
FIG. 2 is a schematic diagram of a hybrid cord constructed according to another embodiment of the present invention.
Figure 3:
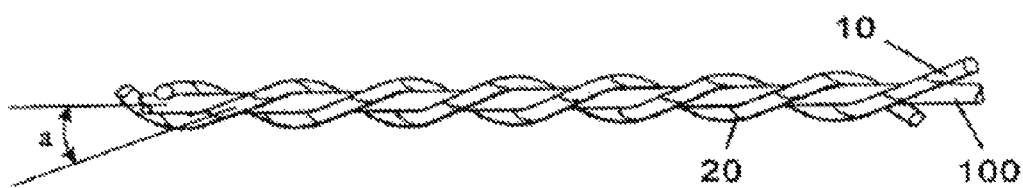
FIG. 3 is a schematic diagram of a hybrid cord constructed according to yet another embodiment of the present invention.

In one embodiment, the core yarn 100 with the first twist or without the first twist can be wrapped (second twist) in a certain way with one or more plies of twisted wrapping yarn 10 to form a hybrid cord. FIG. 1 shows core yarn 100 without a first twist and FIG. 2 shows core yarn 100 with a first twist. FIG. 3 shows core yarn 100 without a first twist and wrapped with wrapping yarns 10 and 20. In FIGS. 1-3, "a" indicates the helical angle of the wrapping yarn.

Figure 5:
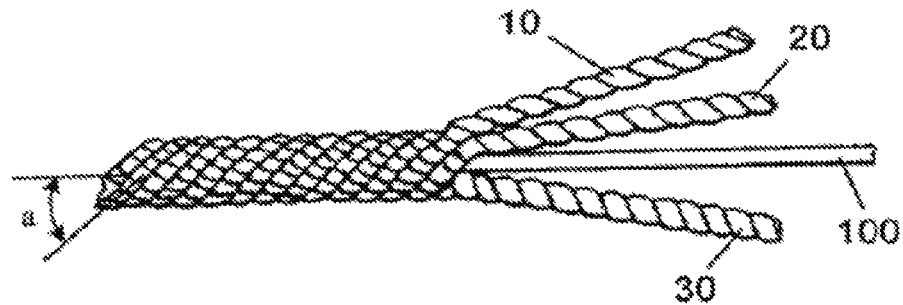
FIG. 5 is a schematic diagram of a hybrid cord constructed according to yet another embodiment of the present invention.
Figure 6:
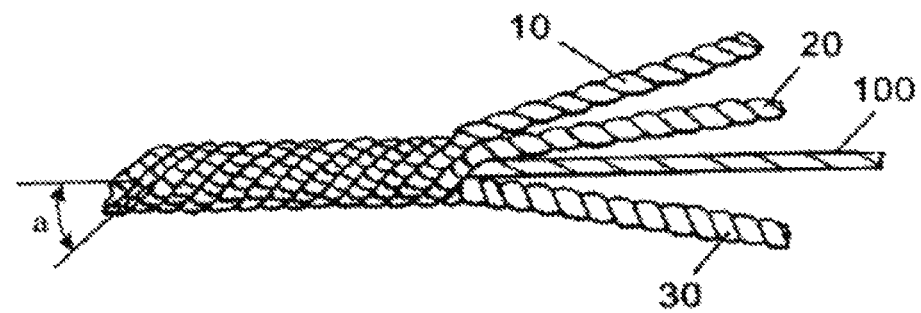
FIG. 6 is a schematic diagram of a hybrid cord constructed according to a further embodiment of the present invention.
Figure 7:
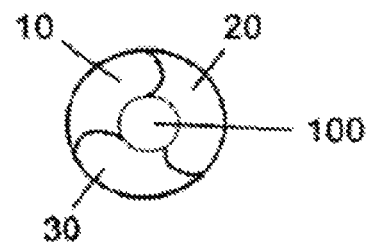
FIG. 7 is the cross section view of the hybrid cord in FIG. 5.

In a further embodiment, one or more plies of twisted wrapping yarn 10, 20 and/or 30 wrap helically (second twist) around the core yarn 100 with a first twist or without a first to form a hybrid cord, for example, as the shown in FIG. 5-7. In this case, the core yarn 100 is not twisted together with the wrapping yarns 10, 20 and 30. FIG. 5 shows core yarn 100 without a first twist and FIG. 6 shows core yarn 100 with a first twist. A cross-sectional view of the hybrid cord of FIG. 5 is depicted in FIG. 7. Also, when there are two or more plies of wrapping yarns present, the two or more plies of wrapping yarns all wrap around the core yarn parallel to each other at the same helical angle "a".

The twisting direction of the yarn can be clockwise or counter-clockwise. Normally, the twisting direction of the first twist of the core yarn and the twisting direction of the first twist of the wrapping yarn can be the same or different, but the twisting direction of the first twist of the wrapping yarn and the twisting direction of the second twist of the hybrid cord are different.

In the hybrid cord of the present invention, the helical angle of the winding yarn is from 10 to 60 degrees, preferably from 25 to 50 degrees. The helical angle can be observed and measured using a microscope to obtain its value.

When evaluating the yarn and/or cord by the twist multiplier (TM), the twist multiplier of the core yarn of the hybrid cord of the present invention is 0-0.5 and the twist multiplier of the second twist of the hybrid cord is 4.5-12, preferably 5-8.5, wherein the twist multiplier is calculated by the equation as follows:

For yarn consisting of fibers with the same specific weight, for example, for the first twist of the core yarn or wrapping yarn of the hybrid cord of the present invention:

$$TM = TPM \times \frac{\sqrt{\frac{D}{\rho}}}{2395}$$

Wherein
TM: Twist multiplier (no units)
TPM: Twist number (twists/meter)
D: Linear density of the yarn (denier)
$\rho$: Specific weight of the yarn (g/cm$^3$).

For yarn or cord consisting of two or more plies of fibers with different specific weights, for example, for the hybrid cord of the present invention consisting of the core yarn of meta-aromatic polyamide and the wrapping yarn of para-aromatic polyamide, the method to calculate the twist multiplier is as follows:

$$TM = TPM \times \frac{\sqrt{\frac{D_1}{\rho_1} + \frac{D_2}{\rho_2}}}{2395}$$

Wherein
TM: Twist multiplier (no units)
TPM: Twist (twists/meter)
$D_1$: Linear density of the wrapping yarn of para-aromatic polyamide (denier)
$\rho_1$: Specific weight of the wrapping yarn of para-aromatic polyamide (g/cm$^3$)
$\rho_2$: Linear density of the core yarn of meta-aromatic polyamide (denier)
$\rho_2$: Specific weight of the core yarn of meta-aromatic polyamide (g/cm$^3$)

The hybrid cord of the present invention has a 9 grams/denier or greater tenacity and 20% or greater elongation at break, and the properties mentioned above are determined in accordance with the ASTM D-7269-8 standard method. The hybrid cord can be applied ideally for the reinforcement of rubber and other elastic products.

Sometimes, to meet to the requirements of different rubber products and other elastic products, the surface of the hybrid cord of the present invention can be coated or dipped with a suitable adhesive to enhance the bonding between said hybrid cord and rubber or the elastic substrate. The adhesive is known to the technical personnel in the present field. Here, for the sake of brevity, further description of it is omitted.

There are no specific restrictions to articles containing the hybrid cord of the present invention. They can be rubber products or other elastic matrix products, such as pneumatic tires, hoses, belts, bellows, etc.

The hybrid cord of the present invention can be applied to an pneumatic tire with at least one tire carcass layer, and the at least one tire carcass layer contains many of the hybrid cords placed parallel to each other.

The hybrid cord of the present invention can also be applied to an pneumatic tire with at least one buffer protective layer, and the at least one buffer protective layer contains many of the hybrid cords placed parallel to each other.

The hybrid cord of the present invention can also be applied to a rubber hose, and the rubber hose is one with at least one layer containing many of the hybrid cords placed parallel to each other.

The hybrid cord of the present invention can also be applied to a bellow, and the bellow is one with at least one layer containing many of the hybrid cords placed parallel to each other.

The hybrid cord of the present invention can also be applied to an air spring, and the air spring is one with at least one layer containing many of the hybrid cords placed parallel to each other.

EXAMPLES

Embodiments of the present invention are further defined in the following examples, but the scope of the present invention is not limited by these examples.
Materials used:
Kevlar® 2F0037 fibers of 1000 denier, 1.44 g/cm$^3$ in specific weight, available from DuPont;
Kevlar® 2F0036 fibers of 1500 denier, 1.44 g/cm$^3$ in specific weight, available from DuPont;
Kevlar® 1F249 fibers of 1500 denier, 1.44 g/cm$^3$ in specific weight, available from DuPont;
Nomex® T430 fibers of 200 denier, 1.38 g/cm$^3$ in specific weight, available from DuPont;
Nylon 66 fibers T-728 of 1260 denier, 1.14 g/cm$^3$ in specific weight, available from Invista.
The same ring twister was used for the core yarns, wrapping yarns, and hybrid cords in the following examples and comparative examples of the present invention, and they were twisted in accordance with the specified twist(s).

Example 1

A ply of Kevlar® 2F0037 fibers of 1000 denier was twisted in one direction at 400 twists/meter, then it was combined with a ply of untwisted Nomex® T430 fibers of 1200 denier, and then twisted together in the opposite direction at 400 twists/meter to form a hybrid cord (as generally depicted in FIG. 1), and the twist multiplier of the second twist of the hybrid cord is 6.6.

Example 2

Three plies of Kevlar® 2F0036 fibers of 1500 denier were twisted in one direction at 200 twists/meter, then they were combined with three plies of untwisted Nomex® 1430 fibers of 1200 denier, then twisted together in the opposite direction at 200 twists/meter to form a hybrid cord (as generally depicted in FIG. 1), and the twist multiplier of the second twist of the hybrid cord is 6.3.

Example 3

Each ply of Kevlar® 2F0036 fibers of 1500 denier was twisted individually at 310 twists/meter, then three plies of the twisted Kevlar® yarns were twisted in the opposite direction at 310 twists/meter to wrap around one ply of untwisted Nomex® T430 fibers of 1200 denier which served as the core yarn, to form a hybrid cord (as generally depicted in FIG. 5). The twist multiplier of the second twist of the hybrid cord is 8.2.

Example 4

Three plies of Kevlar® 2F0036 fibers of 1500 denier were twisted in one direction at 200 twists/meter, and three plies of Nomex® T430 fibers of 1200 denier were twisted in the same direction at 8 twists/meter, then they were combined and twisted together in the opposite direction at 200 twists/meter to form a hybrid cord (as generally depicted in FIG. 2). The twist multiplier of the core yarn is 0.17, while the twist multiplier of the hybrid cord is 6.3.

Example 5

Three plies of Kevlar® 2F0036 fibers of 1500 denier were twisted in one direction at 200 twists/meter and three plies of Nomex® T430 fibers of 1200 denier were twisted in the same direction at 20 twists/meter, then they were combined and twisted in the opposite direction at 200 twists/meter to form a hybrid cord (as generally depicted in FIG. 2). The twist multiplier of the core yarn is 0.43; while the twist multiplier of the hybrid cord is 6.3.

Comparative Example 1

A single ply of Kevlar® 1F249 fibers of 1500 denier was twisted at 480 twists/meter, and the twist multiplier is 6.5.

Comparative Example 2

A single ply of Kevlar® 1F249 fibers of 1500 denier was twisted at 610 twists/meter, and the twist multiplier is 8.2.

Comparative Example 3

A single ply of Kevlar® 2F0036 fibers of 1500 denier was twisted at 80 twists/meter, and the twist multiplier is 1.1.

Comparative Example 4

A single ply of Kevlar® 2F0036 fibers of 1500 denier was twisted at 400 twists/meter, and the twist multiplier is 5.4.

Comparative Example 5

Three plies of Kevlar® 2F0036 fibers of 1500 denier were twisted at 200 twists/meter, and the twist multiplier is 4.7.

Comparative Example 6

Figure 4:
FIG. 4 is a schematic diagram of the construction of a comparative example of the present invention.

One ply of untwisted Kevlar® 2F0036 fibers of 1500 denier and one ply of untwisted Nomex® fibers of 1200 denier were combined and twisted at 200 twists/meter to form a hybrid cord (as generally depicted in FIG. 4), and the twist multiplier is 3.6.

Comparative Example 7

Three plies of Kevlar® 1F249 fibers of 1500 denier were twisted in one direction at 245 twists/meter, and three plies of nylon yarn of 1260 denier were twisted in the same direction at 8 twists/meter, then they were combined and twisted together in the opposite direction at 245 twists/meter to form a hybrid cord (as generally depicted in FIG. 2). The twist multiplier of the hybrid cord is 8.2.

Comparative Example 8

Three plies of Kevlar® 1F249 fibers of 1500 denier were twisted in one direction at 160 twists/meter, and three plies of nylon yarn of 1260 denier were twisted in the same direction at 8 twists/meter, then they are combined and twisted together in the opposite direction at 160 twists/meter to form a hybrid cord (as generally depicted in FIG. 2). The twist multiplier of the hybrid cord is 5.4.

Comparative Example 9

Three plies of Kevlar® 1F249 fibers of 1500 denier were twisted in one direction at 200 twists/meter, and three plies of nylon yarn of 1260 denier were twisted in the opposite direction at 100 twists/meter then they were combined and twisted together in the same twisting direction of the nylon fibers at 200 twists/meter to form a hybrid cord, and the twist multiplier of the hybrid cord is 6.7.

Comparative Example 10

Each ply of Kevlar® 2F0036 fibers of 1500 denier was twisted individually at 290 twists/meter, then three plies of twisted Kevlar® yarn were twisted in the opposite direction at 290 twists/meter around one ply of untwisted nylon fibers of 840 denier to form a hybrid cord (as generally depicted in FIG. 5). The twist multiplier of the second twist of the hybrid cord is 7.5.

Performance Test

The hybrid cords obtained in the examples and comparative examples mentioned above were tested using the standard method of ASTM 07269-08 for their tenacity and elongation at break; the helical angles of the wrapping yarn in the hybrid cords in Examples 1-5 were observed and measured using a microscope. The results are listed in Table 1:

TABLE 1

|  | Weight % of the core yarn in the hybrid cord | Twist multiplier of the core yarn | Twist multiplier of the second twist | Helical angle (degrees) | Tenacity (g/denier) | Elongation at break (%) |
|---|---|---|---|---|---|---|
| Example 1 | 54.5 | 0 | 6.6 | 45 | 10.2 | 21.3 |
| Example 2 | 44.4 | 0 | 6.3 | 40 | 11.1 | 21.1 |
| Example 3 | 21.1 | 0 | 8.2 | 50 | 10.8 | 20.5 |
| Example 4 | 44.4 | 0.17 | 6.3 | 50 | 10.2 | 24.2 |
| Example 5 | 44.4 | 0.43 | 6.3 | 25 | 10.2 | 22.9 |
| Comparative Example 1 | — | 6.5 | NA | — | 10.1 | 5.3 |
| Comparative Example 2 | — | 8.2 | NA | — | 8.4 | 8.5 |
| Comparative Example 3 | — | 1.1 | NA | — | 25.9 | 3.9 |
| Comparative Example 4 | — | 5.4 | NA | — | 12.2 | 6.3 |
| Comparative Example 5 | — | 4.7 | NA | — | 14.0 | 5.3 |
| Comparative Example 6 | — | 0 | 3.6 | — | 11.7 | 7.0 |
| Comparative Example 7 | — | 0.2 | 8.2 | — | 5.56 | 21.3 |
| Comparative Example 8 | — | 0.2 | 5.4 | — | 12.7 | 16.1 |
| Comparative Example 9 | — | 2.3 | 6.7 | — | 6.4 | 22.5 |
| Comparative Example 10 | — | 0 | 7.5 | — | 10.6 | 13.2 |

Judging by the test results listed above, the hybrid cord of the present invention with meta-aromatic polyamide fibers as the core yarn and para-aromatic polyamide fibers as the wrapping yarn achieved a good balance between the tenacity and the elongation at break. Such hybrid cords are very suitable to be applied to rubber products requiring high strength and resistance to high pressure as well as having sufficient deformation and expandability, making them particularly suitable for use in pneumatic rubber tires, such as aircraft tires.

What is claimed is:

1. A hybrid cord comprising:
    (a) a core yarn consisting of meta-aromatic polyamide fibers, and
    (b) at least one wrapping yarn consisting of para-aromatic polyamide fibers that wraps around the core yarn at a helical angle,
   wherein
    (i) the core yarn makes up 20-60% by weight and the wrapping yarn makes up 40-80% by weight of the hybrid cord, based on the total weight of the hybrid cord,
    (ii) the twist multiplier of the core yarn is 0-0.5, the twist multiplier of the hybrid cord is greater than 5 and no greater than 8.5; and the twist per meter (tpm) ratio between the at least one wrapping yarn and the hybrid cord ranges from 0.8 to 1.2,
    (iii) the helical angle of the wrapping yarn is 10-60 degrees, and wherein the elongation at break of the hybrid cord is 20% or greater.

2. The hybrid cord of claim 1, having a tenacity of 9 grams/denier.

3. The hybrid cord of claim 1, wherein the core yarn is consisting of at least one ply of meta-aromatic polyamide fibers and each ply has at least one of the properties selected from the group consisting of a ply linear density of 200-3500 denier, a tenacity of 3-7 grams/denier, and an elongation at break of 20-40%.

4. The hybrid cord of claim 1, wherein each wrapping yarn is consisting of at least one ply of para-aromatic polyamide fibers and each ply has at least one of the properties selected from the group consisting of a ply linear density of 200-3500 denier, a tenacity of 18-28 grams/denier, and an elongation at break of 1.5-5.0%.

5. An article selected from the group consisting of a pneumatic tire, a hose, a belt and a bellows comprising the hybrid cord according to claim 1.

6. A method of using the hybrid cord according to claim 1 in the reinforcement of rubber or elastic matrix products.

\* \* \* \* \*